(12) United States Patent
Wang et al.

(10) Patent No.: US 9,006,668 B2
(45) Date of Patent: Apr. 14, 2015

(54) METHOD TO IMPROVE LIGHT EXTRACTION FROM SCINTILLATORS

(71) Applicants: Jerry Wang, Lake Zurich, IL (US); Gin Chung Wang, Grayslake, IL (US); Huini Du, Vernon Hills, IL (US)

(72) Inventors: Jerry Wang, Lake Zurich, IL (US); Gin Chung Wang, Grayslake, IL (US); Huini Du, Vernon Hills, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 228 days.

(21) Appl. No.: 13/633,646

(22) Filed: Oct. 2, 2012

(65) Prior Publication Data
US 2014/0091234 A1 Apr. 3, 2014

(51) Int. Cl.
*G01T 1/20* (2006.01)
(52) U.S. Cl.
CPC ..................... *G01T 1/2002* (2013.01)
(58) Field of Classification Search
CPC ...................................................... G01T 1/2002
USPC ......................................................... 250/368
See application file for complete search history.

(56) References Cited

U.S. PATENT DOCUMENTS

| 4,429,227 A * | 1/1984 | DiBianca et al. ........ 250/370.09 |
| 5,208,460 A | 5/1993 | Rougeot et al. |
| 6,369,390 B1 * | 4/2002 | Genna ............................ 250/368 |
| 2012/0205545 A1 | 8/2012 | Kaneko et al. |

FOREIGN PATENT DOCUMENTS

| EP | 145169 A2 * | 6/1985 |
| JP | 5-203755 A | 8/1993 |
| JP | 2009-42029 A | 2/2009 |
| JP | 2012-159360 A | 8/2012 |
| JP | 2012-168059 A | 9/2012 |

OTHER PUBLICATIONS

International Search Report issued on Dec. 24, 2013 in PCT/JP2013/076731.
T. Fujii, et al., "Increase in the extraction efficiency of GaN-based light-emitting diodes via surface roughening", American Institute of Physics, vol. 84, No. 6, Applied Physics Letters, Feb. 9, 2004, pp. 855-857.

* cited by examiner

*Primary Examiner* — Constantine Hannaher
(74) *Attorney, Agent, or Firm* — Oblon, McClelland, Maier & Neustadt, L.L.P.

(57) ABSTRACT

A method to improve light extraction from scintillators in a gamma ray detector, the method including forming a roughened layer on a light-emitting surface of the scintillators, the roughened thin layer having a pillar/column or a corn-shaped structure.

13 Claims, 3 Drawing Sheets

METHOD TO IMPROVE LIGHT EXTRACTION FROM SCINTILLATORS

FIELD

The present disclosure generally relates to a method to improve light extraction from scintillators. More specifically, the present disclosure relates to a method to improve light extraction from scintillators by adding a roughened layer on the surface of the scintillators.

BACKGROUND

In order to improve the image quality in positron emission tomography (PET), time-of-flight (TOF) PET scanners have been used. For this purpose, detectors with higher timing resolution are required. Timing resolution is expressed as $$\Delta \tau \propto \sqrt{\frac{\tau}{n_{Phe}}}$$

where $\tau$ is the decay time of the scintillator, and $n_{Phe}$ is the photoelectron number, which is proportional to light yield. A large photoelectron number or a higher light yield is desired to get better timing resolution.

Computed tomography (CT) has a similar timing issue. For example, fast kV-switching techniques for dual energy CT requires very prompt signals.

To increase light yield, various methods have been used to improve intrinsic properties of scintillation materials. Various methods have also been used to increase light extraction by modifying the light emitting surface of the scintillators. For example, light output from a semiconductor laser and an LED has been improved by roughening the light-emitting surface. For scintillators, a "roughened surface" obtained by lapping the scintillator surface is conventionally used to extract more light from the scintillator. Also, a lithography method has been used to extract more light from scintillation materials by making a photonic crystal structure on the surface of scintillation materials.

Conventionally, optical glue is used to couple the scintillator with the optical sensor (e.g., PMTs and photodiodes). However, optical glue does not have an appropriate refraction index, and therefore, a portion of the light is reflected back into the scintillator due to total reflection. Therefore, the light is not efficiently extracted from the scintillator, which slows the rising of the detected signal pulse, and as a result, deteriorates the timing resolution.

Accordingly, there is a need for an efficient method to improve light extraction from scintillators.

BRIEF DESCRIPTION OF THE DRAWINGS

A more complete appreciation of the embodiments described herein, and many of the attendant advantages thereof will be readily obtained as the same becomes better understood by reference to the following detailed description when considered in connection with the accompanying drawings, wherein.

DETAILED DESCRIPTION

According to one embodiment, a method is described to improve light extraction from scintillators in a gamma ray detector by forming a roughened layer on a light-emitting surface of the scintillators, wherein the roughened layer has a pillar/column or a corn-shaped structure.

According to one embodiment, a method is described to improve light extraction from scintillators in a gamma ray detector by depositing a first thin layer on the light-emitting surface of the scintillators, the first thin layer including a thin film or scattered particles, and depositing a second thin layer on the first thin layer, the second thin layer having a roughened surface.

According to one embodiment, a method is described to improve light extraction from scintillators in a gamma ray detector by depositing a first thin layer on the light-emitting surface of the scintillators, depositing a second thin layer on the first thin layer, and roughening the second thin layer.

According to one embodiment, a roughened layer is added on the scintillators in a PET detector, causing more light to be emitted from the scintillators at an early stage, and improving the timing resolution of the detector. Such improvement in the timing resolution improves the PET image, and makes it easier to detect small lesions and diagnose larger patients.

In the photonic crystal method, the surface is roughened only partially, and thus the light extraction is not very efficient. Moreover, since many steps are involved in this method, the fabrication cost is high.

According to one embodiment, to extract more light from the scintillators, a roughened layer having a microstructure is formed on the light-emitting surface of the scintillators.

Figure 1:
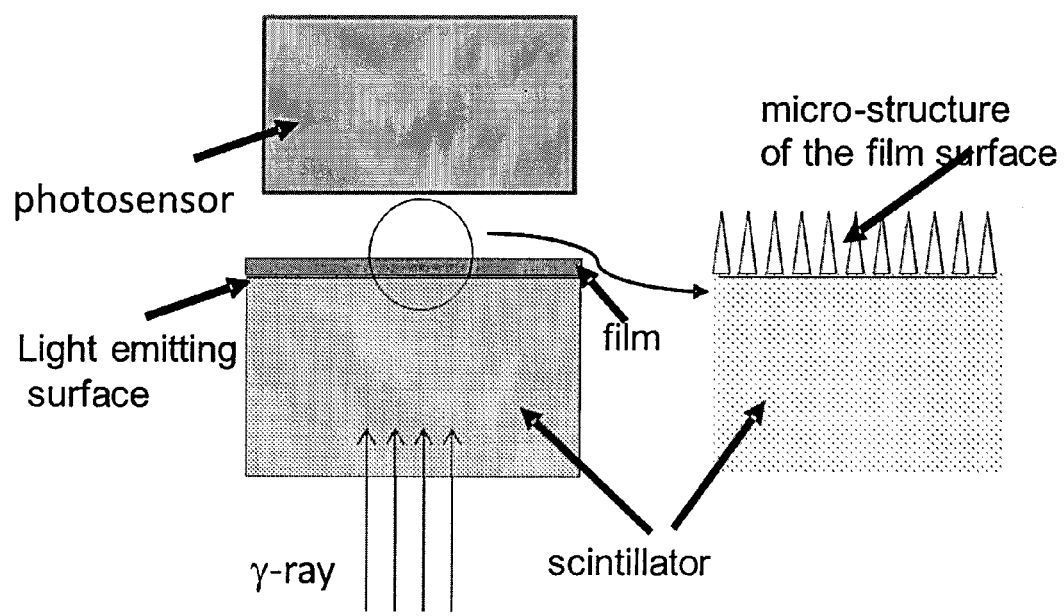
FIG. 1 shows a roughened layer with a corn-shaped microstructure made on the light-emitting surface of a scintillator according to one embodiment.

Referring now to the drawings, wherein like reference numerals designate identical or corresponding parts throughout the several views, FIG. 1 shows an example of a roughened layer with a corn-shaped microstructure made on the light-emitting surface of a scintillator according to one embodiment. At a suitable temperature, a first thin film with a high refractive index and good transmittance is deposited on the light-emitting surface of the scintillators. According to one embodiment, the first thin film is made of, e.g., $Al_2O_3$, $Si_xN_y$, $ZrO_2$, $TiO_2$, ZnS, or ZnO, is deposited at a temperature between 250° C. and 850° C., has a refractive index in the range of 1.7 to 2.1, has an optical transmittance in the scintillation wavelength range of the scintillators, and has a thickness in the range of 0.3 to 15 μm.

Then, a second thin film with desired properties is deposited. According to one embodiment, the second thin film, made of, e.g., $Al_2O_3$, $Si_xN_y$, $ZrO_2$, $TiO_2$, ZnS, ZnO, or other suitable material, is deposited at a temperature between 250° C. and 850° C. According to one embodiment, the second thin film has a thickness in the range of 0.3 to 15 μm, is non-toxic, and has a low processing temperature.

According to one embodiment, the obtained roughened surface has a pillar/column, corn-shaped, or another similar microstructure. The first thin layer acts as a template to make the second thin layer rough. According to one embodiment, the first layer makes the second thin layer grow at different rates at different locations, so the grown second thin layer has a rough surface.

Alternatively, the microstructure can be achieved at a later time with a micro-fabrication method. According to one embodiment, the microstructure can be achieved by directly chemical etching the second thin layer. According to another embodiment, the microstructure can be achieved by depositing scattered small particles on the second thin layer to act as a mask, and then roughening the surface of the second thin layer by chemical etching and/or ion-milling, or other methods which can remove unwanted material.

Figure 2:
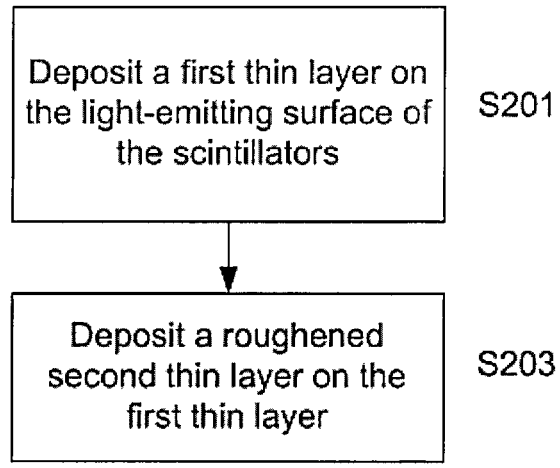
FIG. 2 shows a flowchart of a first method to improve light extraction from the scintillators according to one embodiment.

FIG. 2 shows a flowchart of a first method to improve light extraction from scintillators according to one embodiment.

In step S201, a first thin layer is deposited on the light-emitting surface of the scintillators. The first thin layer has a high refractive index and good transmittance. The first thin layer is deposited at a suitable temperature, e.g. between 250° C. and 850° C. According to one embodiment, the first thin layer is made of, e.g., $Al_2O_3$, $Si_xN_y$, $ZrO_2$, $TiO_2$, ZnS, or ZnO, has a refractive index in the range of 1.7 to 2.1, has an optical transmittance in the scintillation wavelength range of the scintillators, and has a thickness in the range of 0.3 to 15 µm.

Alternatively, particles with small size may be deposited on the light-emitting surface of the scintillators.

In step S203, a roughened second thin layer with desired properties is deposited on the first thin layer. The second thin layer is deposited at a suitable temperature, e.g. between 250° C. and 850° C. According to one embodiment, the second thin layer is made of, e.g., $Al_2O_3$, $Si_xN_y$, $ZrO_2$, $TiO_2$, ZnS, or ZnO, is deposited at a temperature between 250° C. and 850° C., has a thickness in the range of 0.3 to 15 µm, is non-toxic, and has a low processing temperature.

Figure 3:
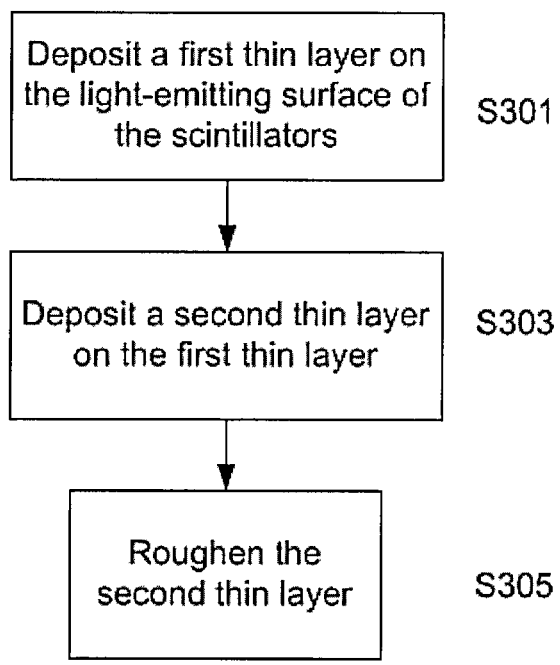
FIG. 3 shows a flowchart of a second method to improve light extraction from the scintillators according to one embodiment.

FIG. 3 shows a flowchart of a second method to improve light extraction from scintillators according to one embodiment.

In step S301, a first thin layer is deposited on the light-emitting surface of the scintillators.

In step S303, a second thin layer is deposited on the first thin layer.

In step S305, the second thin layer is roughened. The roughening step may be performed via a physical or a chemical process. The roughened second thin layer has a pillar-column, corn-shaped, or another similar microstructure. The roughening step may be performed via a micro-fabrication method. According to one embodiment, the microstructure is achieved by directly chemical etching the second thin layer. According to another embodiment, the microstructure is achieved by depositing scattered small particles on the second thin layer to act as a mask, and then roughening the surface of the second thin layer by chemical etching and/or ion-milling.

Figure 4:
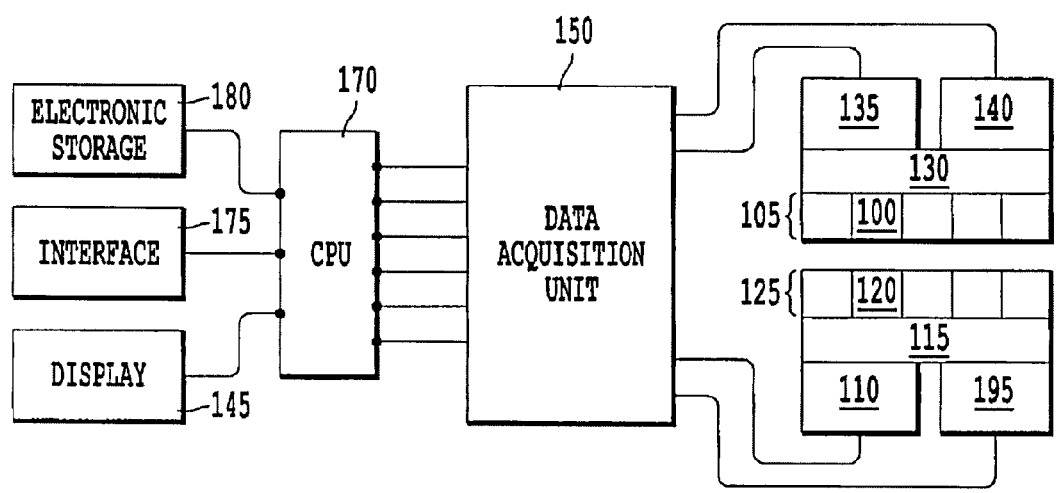
FIG. 4 shows an example block diagram of a gamma ray detector.

FIG. 4 shows an exemplary hardware configuration that can be used with the present technological advancement to detect gamma rays. In FIG. 4, photomultiplier tubes 135 and 140 are arranged over light guide 130, and the array of scintillation crystals 105 is arranged beneath the light guide 130. A second array of scintillation crystals 125 is disposed opposite the scintillation crystals 105 with light guide 115 and photomultiplier tubes 195 and 110 arranged thereover.

In FIG. 4, when gamma rays are emitted from a body under test (not shown), the gamma rays travel in opposite directions, approximately 180° from each other. Gamma ray detection occurs simultaneously at scintillation crystals 100 and 120, and a scintillation event is determined when the gamma rays are detected at scintillation crystals 100 and 120 within a predefined time limit. Thus, the gamma ray timing detection system detects gamma rays simultaneously at scintillation crystals 100 and 120. However, for simplicity only, gamma ray detection is described relative to scintillation crystal 100. One of ordinary skill in the art will recognize, however, that the description given herein with respect to scintillation crystal 100 is equally applicable to gamma ray detection at scintillation crystal 120.

Each photomultiplier tube 110, 135, 140 and 195 is respectively connected to data acquisition unit 150. The data acquisition unit 150 includes hardware configured to process the signals from the photomultiplier tubes. The data acquisition unit 150 measures the arrival time of the gamma ray. The data acquisition unit 150 produces two outputs (one for the combination of PMT 135/140 and one for the combination of PMT 110/195) which encodes the time of the discriminator pulse relative to a system clock (not shown). For a time of flight PET system, the data acquisition unit 150 typically produces a time stamp with an accuracy of 15 to 25 ps. The data acquisition unit measures the amplitude of the signal on each PMT (four of the outputs from data acquisition unit 150).

The data acquisition unit outputs are provided to a CPU, 170, for processing. The processing consists of estimating an energy and position from the data acquisition unit outputs and an arrival time from the time stamps output for each event, and may include the application of many correction steps, based on prior calibrations, to improve the accuracy of the energy, position, and time estimates. As one of ordinary skill in the art would recognize, the CPU 170 can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the CPU 170 may be implemented as a set of computer-readable instructions stored in any of the above-described electronic memories and/or a hard disc drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art.

Once processed by the CPU 170, the processed signals are stored in electronic storage 180, and/or displayed on display 145. As one of ordinary skill in the art would recognize, electronic storage 180 may be a hard disk drive, CD-ROM drive, DVD drive, FLASH drive, RAM, ROM or any other electronic storage known in the art. Display 145 may be implemented as an LCD display, CRT display, plasma display, OLED, LED or any other display known in the art. As such, the descriptions of the electronic storage 180 and the display 145 provided herein are merely exemplary and in no way limit the scope of the present advancements.

FIG. 4 also includes an interface 175 through which the gamma ray detection system interfaces with other external devices and/or a user. For example, interface 175 may be a USB interface, PCMCIA interface, Ethernet interface or any other interface known in the art. Interface 175 may also be wired or wireless and may include a keyboard and/or mouse or other human interface devices known in the art for interacting with a user.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A method to improve light extraction from scintillators in a gamma ray detector, the method comprising:
    forming a roughened layer on a light-emitting surface of the scintillators, wherein the forming step comprises:
    depositing a first thin layer on the light-emitting surface of the scintillators, the first thin layer including a thin film or scattered particles; and
    depositing a second thin layer on the first thin layer, the second thin layer having a roughened surface.

2. The method of claim 1, wherein the forming step comprises:
    forming the roughened layer with a refractive index between 1.7 and 2.1 and an optical transmittance in a wavelength range of the scintillation of the scintillators.

3. The method of claim 1, wherein the forming step comprises:
    forming the roughened layer, which is made of $Al_2O_3$, $Si_xN_y$, $ZrO_2$, $TiO_2$, ZnS, or ZnO.

4. The method of claim 1, wherein
    the step of depositing the first thin layer comprises depositing the first thin layer at a temperature between 250° C. and 850° C.; and
    the step of depositing the second thin layer comprises depositing the second thin layer at a temperature between 250° C. and 850° C.

5. A method to improve light extraction from scintillators in a gamma ray detector, the method comprising:
    forming a roughened layer on a light-emitting surface of the scintillators, wherein the forming step comprises:
    depositing a first thin layer on the light-emitting surface of the scintillators;
    depositing a second thin layer on the first thin layer; and
    roughening the second thin layer.

6. The method of claim 5, wherein the roughening step comprises:
    roughening the second thin layer via a physical process.

7. The method of claim 5, wherein the roughening step comprises:
    roughening the second thin layer via a chemical process.

8. The method of claim 7, wherein the step of roughening the second thin layer comprises:
    chemical etching the second thin layer.

9. The method of claim 7, wherein the step of roughening the second thin layer comprises:
    depositing scattered masking particles on the second thin layer; and
    performing at least one of a chemical etching or an ion-milling on the second thin layer.

10. The method of claim 5, wherein
    the step of depositing the first thin layer comprises depositing the first thin layer at a temperature between 250° C. and 850° C.; and
    the step of depositing the second thin layer comprises depositing the second thin layer at a temperature between 250° C. and 850° C.

11. A gamma ray detector, comprising:
    an array of scintillators having a roughened layer formed on a light-emitting surface of the scintillators, wherein the roughened layer includes
    a first thin layer deposited on the light-emitting surface of the scintillators, the first thin layer including a thin film or scattered particles; and
    a second thin layer deposited on the first thin layer, the second thin layer having a roughened surface.

12. The gamma ray detector of claim 11, wherein the roughened layer is made of material with a refractive index between 1.7 and 2.1 and an optical transmittance in a wavelength range of the scintillation of the scintillators.

13. The gamma ray detector of claim 11, wherein the roughened layer is made of $Al_2O_3$, $Si_xN_y$, $ZrO_2$, $TiO_2$, ZnS, or ZnO.

* * * * *